US009449345B2

(12) United States Patent
Lundgren et al.

(10) Patent No.: US 9,449,345 B2
(45) Date of Patent: Sep. 20, 2016

(54) METHOD AND SYSTEM FOR AUTHORIZING NETWORK TRANSACTIONS BASED ON RADIO FREQUENCY (RF) CHARACTERIZATION OF A DEVICE'S LOCATION

(75) Inventors: David Lundgren, Mill Valley, CA (US); Mark Buer, Gilbert, AZ (US); Charles Abraham, Los Gatos, CA (US); David Garrett, Tustin, CA (US); Jeyhan Karaoguz, Irvine, CA (US); David Murray, Mission Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1618 days.

(21) Appl. No.: 12/748,197

(22) Filed: Mar. 26, 2010

(65) Prior Publication Data

US 2011/0202461 A1  Aug. 18, 2011

Related U.S. Application Data (60) Provisional application No. 61/304,947, filed on Feb. 16, 2010, provisional application No. 61/312,979, filed on Mar. 11, 2010, provisional application No. 61/312,994, filed on Mar. 11, 2010, provisional application No. 61/303,794, filed on Feb. 12, 2010, provisional application No. 61/309,260, filed on Mar. 1, 2010.

(51) Int. Cl.
| | |
|---|---|
| *G06Q 40/02* | (2012.01) |
| *G06Q 20/04* | (2012.01) |
| *A63B 71/06* | (2006.01) |
| *H04W 84/18* | (2009.01) |

(52) U.S. Cl.
CPC ......... *G06Q 40/02* (2013.01); *A63B 71/0672* (2013.01); *G06Q 20/04* (2013.01); *H04W 84/18* (2013.01)

(58) Field of Classification Search
CPC ..................................................... G06Q 40/00
USPC ................... 705/35, 44; 235/380; 455/41.2
See application file for complete search history.

(56) References Cited

U.S. PATENT DOCUMENTS

| 7,373,109 | B2 * | 5/2008 | Pohja et al. ................. 455/41.2 |
|---|---|---|---|
| 8,036,658 | B2 * | 10/2011 | Govindswamy et al. .... 455/434 |
| 2002/0035460 | A1 * | 3/2002 | Hales .............................. 703/13 |
| 2003/0225893 | A1 | 12/2003 | Roese et al. |
| 2005/0147074 | A1 * | 7/2005 | Maufer et al. ................ 370/338 |
| 2005/0242177 | A1 * | 11/2005 | Roberge et al. .............. 235/383 |
| 2006/0214773 | A1 * | 9/2006 | Wagner et al. .............. 340/10.2 |
| 2007/0084913 | A1 * | 4/2007 | Weston ......................... 235/380 |
| 2010/0079243 | A1 * | 4/2010 | Hamada ...................... 340/5.83 |

* cited by examiner

*Primary Examiner* — Kirsten Apple
*Assistant Examiner* — Abdulmajeed Aziz
(74) *Attorney, Agent, or Firm* — Sterne, Kessler, Goldstein & Fox PLLC (57) ABSTRACT

Aspects of a method and system for authorizing network transactions based on radio frequency (RF) characterization of a device's location are provided. In this regard, whether to approve a communication device to perform a network transaction may be determined based on results of a comparison between a radio frequency (RE) characterization of a location of the communication device and one or more approved RF characterizations. The RF characterization may be based on information from a plurality of receivers within the communication device. The one or more approved characterizations may be stored in the network device. The RF characterization may indicate a quantity of RF sources detected and identified by the communication device at the location. The RF characterization may indicate signal strength of signals received from RF sources detected and indentified by the communication device at the location.

20 Claims, 5 Drawing Sheets

METHOD AND SYSTEM FOR AUTHORIZING NETWORK TRANSACTIONS BASED ON RADIO FREQUENCY (RF) CHARACTERIZATION OF A DEVICE'S LOCATION

CROSS-REFERENCE TO RELATED APPLICATIONS/INCORPORATION BY REFERENCE

This patent application makes reference to, claims priority to and claims benefit from:
U.S. Provisional Patent Application Ser. No. 61/304,947 filed on Feb. 16, 2010;
U.S. Provisional Patent Application Ser. No. 61/312,979 filed on Mar. 11, 2010;
U.S. Provisional Patent Application Ser. No. 61/312,994 filed on Mar. 11, 2010;
U.S. Provisional Patent Application Ser. No. 61/303,794 filed on Feb. 12, 2010; and
U.S. Provisional Patent Application Ser. No. 61/309,260 filed on Mar. 1, 2010.

This Application also makes reference to:
U.S. patent application Ser. No. 12/732,849 filed on even date herewith;
U.S. patent application Ser. No. 12/748,106 filed on even date herewith;
U.S. patent application Ser. No. 12/748,175 filed on even date herewith; and
U.S. patent application Ser. No. 12/748,104 filed on even date herewith.

Each of the above stated applications is hereby incorporated herein by reference in its entirety.

FIELD OF THE INVENTION

Certain embodiments of the invention relate to networking. More specifically, certain embodiments of the invention relate to a method and system for authorizing network transactions based on radio frequency (RF) characterization of a device's location.

BACKGROUND OF THE INVENTION

The security of electronic networks continues to grow in importance as more and more sensitive information is stored electronically and communicated via such electronic networks. Businesses seeking to protect trade secrets and individuals seeking to protect their credit and identity are two primary forces driving the need for stronger network security. In this regard, the fact that such problems are prevalent today illustrates that traditional security techniques such as username/password requirements and various encryption techniques are insufficient in many instances.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for authorizing network transactions based on radio frequency (RF) characterization of a device's location, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system authorizing network transactions based on radio frequency (RF) characterization of a device's location. In various embodiments of the invention, whether to approve a communication device to perform a network transaction may be determined based on results of a comparison between a radio frequency (RE) characterization of a location of the communication device and one or more approved RF characterizations. The RF characterization may be based on information from a plurality of receivers within the communication device. The one or more approved characterizations may be stored in the network device. The RF characterization may indicate a quantity of RF sources detected and identified by the communication device at the location of the communication device. The RF characterization may indicate signal strength of signals received from RF sources detected and identified by the communication device at the location. The transaction may be approved only if signal strength of each of the signals is within a determined window, wherein the size of the window may depend on the type of transaction. The RF characterization may indicate an error rate of signals received from RF sources detected and identified by the communication device at the location. The network transaction may comprise authorizing payment via a credit card or other financial account. Whether to approve the communication device to perform the network transaction may be determined based on preferences established for one or both of the communication device and a user of the communication device. Each of the one or more approved characterizations may comprise an RF characterization of a location from which the transaction is authorized.

Figure 1A:
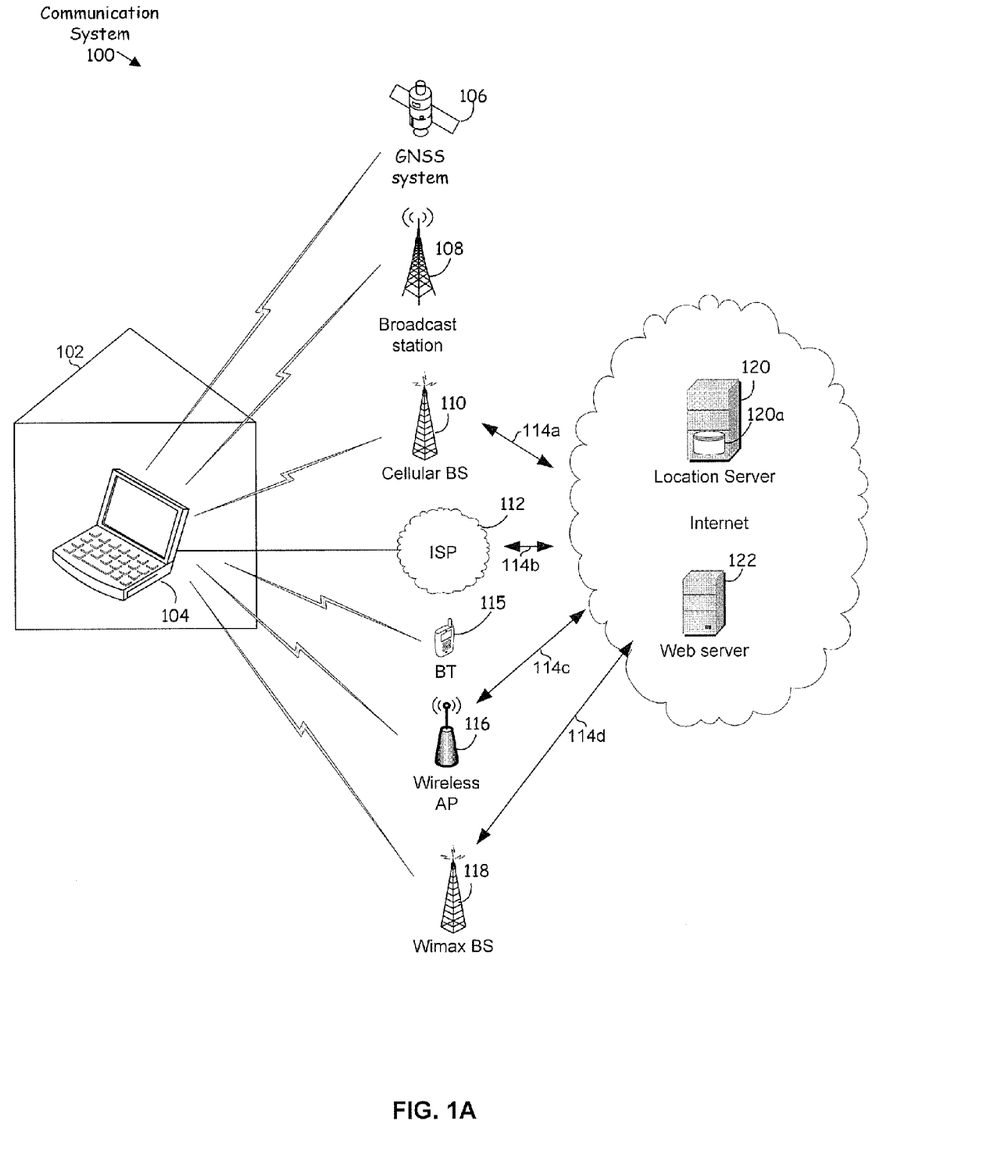
FIG. 1A is a diagram illustrating authorizing network transactions based on an RF characterization of the device's location, in accordance with an embodiment of the invention.

FIG. 1A is a diagram illustrating authorizing network transactions based on an RF characterization of the device's location, in accordance with an embodiment of the invention. Referring to FIG. 1A, there is shown a communication system 100. The communication system 100 comprises a communication device 104 at a location 102, a location server 120 comprising a database 120*a*, an ISP network 112, a GNSS system 106, a broadcast station 108, a wireless local area network access point (WAP) 116, a Bluetooth (BT) device 115, a cellular base station (BS) 110, and a Worldwide Interoperability for Microwave Access (WiMAX) BS 118.

The GNSS system 106 may comprise satellites and/or A-GNSS base stations that may be operable to generate and broadcast satellite navigational information in suitable radio-frequency (RF) signals to various GNSS capable devices.

The broadcast station 108 may comprise, for example, a terrestrial radio and/or terrestrial television transmitter. In this regard, the broadcast station 108 may transmit television and/or radio in accordance with one or more broadcast standards such as, for example, AM radio, FM radio, Radio Data Services (RDS or RBDS), the Digital Video Broadcasting (DVB) family of standards, the Advanced Television Systems Committee (ATSC) family of standards, the Integrated Services Digital Broadcasting (ISDB) family of standards, the Digital Terrestrial Multimedia Broadcast (DTMB) family of standards, and the Digital Multimedia Broadcasting (DMB) family of standards.

The cellular BS 110 may provide voice and/or data services to communication devices such as the device 104 in adherence with one or more cellular communication standards. The cellular communication standards may comprise, for example, Global System for Mobile communications (GSM), General Packet Radio Services (GPRS), Universal Mobile Telecommunications System (UMTS), Enhanced Data rates for GSM Evolution (EDGE), Enhanced GPRS (EGPRS), and/or 3GPP Long Term Evolution (LTE). As indicated by the arrow 114*a*, the cellular BS 110 may communicate with a backbone network and/or the Internet at large via one or more backhaul links and/or associated devices. In this manner, the cellular BS 110 may provide network access to the communication device 104.

The cloud 112 represents one or more links and/or devices of an internet service provider (ISP) network which may provide wired and/or fiber optic network access to the communication device 104. As indicated by the arrow 114*b*, the ISP 112 may communicate with a backbone network and/or the Internet at large via one or more links and/or associated devices. In this manner, the ISP 112 may provide network access to the communication device 104.

The Bluetooth device 115 may provide for communication of data in adherence to Bluetooth standards. Exemplary Bluetooth enabled devices may comprise, a headset, a microphone, a Smartphone, and an automobile.

The WAP 116 may provide data services to communication devices such as the device 104 in adherence with one or more wireless LAN standards such as, for example, IEEE Std 802.11, 802.11a, 802.11b, 802.11d, 802.11e, 802.11n, 802.11v, and/or 802.11u. As indicated by the arrow 114*c*, the WAP 116 may communicate with a backbone network and/or the Internet at large via one or more links and/or associated devices. In this manner, the WAP 116 may provide network access to the communication device 104.

The WiMAX BS 118 may provide data services using WiMAX technology. As indicated by the arrow 114*d*, the WiMAX BS 118 may communicate with a backbone network and/or the Internet at large via one or more links and/or associated devices. In this manner, the WiMAX BS 118 may provide network access to the communication device 104.

Without limiting the invention, and for ease of description, each of the GNSS system 106, the broadcast station 108, the cellular BS 110, the WAP 116, and the WiMAX BS 118 is referred to herein as a RF source. Furthermore, the RF sources depicted in FIG. 1A are only examples and the invention is not limited with regard to the wireless technologies utilized.

The communication device 104 may comprise suitable logic, circuitry, interfaces and/or code for implementing various aspects of the invention. The communication device 104 may be operable to communicate via a plurality of wired and/or wireless connections. In this regard, the mobile device 104 may be operable to transmit and/or receive signals to and/or from one or more of the GNSS infrastructure 106, Bluetooth device 115, a WAP 116, a cellular BS 110, WiMAX BS 118, and broadcast station 108. Also, the communication device 104 may be operable to characterize the RF environment in which it operates. In this regard, a location may be characterized by, for example, detecting and identifying one or more RF sources from which a signal having a minimum signal strength and/or minimum error rate is received. The RF sources may be identified by, for example, frequencies on which they transmit and/or unique identifiers associated with them. Unique identifies may comprise, for example, scrambling codes, IP or other unique network addresses, RDS data, call letters such as utilized by radio and television broadcasters, and pilot or identification tones or signals.

The communication device 104 may also be operable to communicate RF characterizations to, for example, the location server 120. In this regard, the RF characterization and/or communication thereof may occur, occasionally, aperiodically, periodically, and/or upon the occurrence of one or more events. For example, a security policy may determine the frequency with which the device characterizes its location and communicates the results. Similarly, the security policy may determine the events, such as a user attempting to log onto the communication device 104 and/or attempting to complete a secure transaction online, that trigger a characterization of the location and/or communication of the characterization.

The location server 120 may comprise suitable logic, circuitry, interfaces and/or code for implementing various aspects of the invention. In this regard, the location server 120 may be operable to store and/or process RF characterization information for one or more locations. Accordingly, the location server 120 may enable authentication of a communication device, user thereof, and/or location thereof based on an RF characterization of the device's location received from the device. In this regard, the location server 120 may be operable to implement various security protocols for securely exchanging location information with devices to be authenticated, such as the device 104, and/or with devices seeking to authenticate other devices, such as the web server 122, and/or users thereof.

The location server 120 may be operable to adaptively update or refine the location information that it stores. For example, the location information stored in the server 120 may, for example, be dynamically updated based on authenticated RF characterizations received from devices such as the communication device 104. As another example, in instances where information for a particular location or device is not received or reported within a determined time period, the location server 120 may consider that information obsolete.

In operation, a user of the communication device 104 may attempt to conduct a secure transaction with the web server 122. For example, the transaction may comprise an electronic funds transfer such as the user attempting to make a purchase on a website utilizing a credit card or bank account number. For such a transaction, the website may attempt to charge the user's bank or credit card account and the transaction may be processed on the web server 122. To authenticate the device 104, its user, and/or its location, the web server 122 may contact the location server 120 and request that the location server 120 authenticate the device 104, its user, and/or its location. The location server 120 may then request location information from the communication device 104. In response, the communication device 104 may send an RF characterization of the location 102 to the location server 120. The location server 120 may compare the RF characterization received from the communication device 104 with an approved characterization of the location 102. In instances that the RF characterization information matches the approved characterization, the location server 120 may notify the web server 122 that the device 104's authentication was successful and the web server 122 may complete the transaction. Alternatively, if the characterization received from the communication device 104 does not match the approved characterization, the location server 120 may, for example, notify the web server 122 that authentication has failed. In some instances however, failure to authenticate may trigger additional measures, such as, for example, a phone call made to the user to confirm whether the transaction in progress may be fraudulent or otherwise unauthorized.

The approved characterization may have been stored in the location server 120 in a variety of ways. The approved characterization may have been "approved" explicitly or implicitly. Similarly, in various instances, the "approved" characterization may be described as, for example, an "accepted" characterization, a "verified" characterization, or a "known-good" characterization. The approved characterization may correspond to a RF characterization that was previously received from the communication device 104 while at the location 102. For example, if the communication device 104 previously conducted a transaction from the location 102, and that transaction was authenticated, or at least never claimed to be fraudulent, then that RF characterization may be sufficient to authenticate the device 104, its user, and/or its location. The user may have previously, as part of an authenticated transaction, set up a list of locations with various permissions assigned to each location. For example, it may be set up such that, if location 102 is the user's home, then all types and/or amounts of transactions may be permitted, but if location 102 is the local coffee shop, the permitted types of transactions may be fewer and/or a permitted amount per transaction may be lower. The approved characterization may have been received and/or refined from authenticated exchanges with other communication devices. That is, information from customers or subscribers to services provided by the location server 120 may be aggregated and/or reconciled to generate the approved characterizations. The company that owns and/or operates the location server 120 may generate the characterizations through, for example, workers out in the field collecting the information.

Whether a received characterization from the device 104 is sufficiently similar to the approved characterization to be considered a "match," may be determined based on a variety of factors.

An acceptable range of signal strengths and/or error rates that are considered a "match" may be set per location. For example, for locations at which relatively constant RF signals have historically been received, the acceptable range may be smaller, but for locations at which widely variable RF signals have historically been received, the acceptable range may be larger. Notwithstanding, if a location has widely varying RF sources, that location may not be acceptable for some transactions and a user and/or device profile may be configured accordingly.

An acceptable range of signal strengths and/or error rates that are considered a "match" may be set per RF source. For example, for RF sources from which relatively constant RF signals have historically been received, the acceptable range may be smaller, but for RF sources for which widely variable RF signals have historically been received, the acceptable range may be larger. Notwithstanding, if a RF source has widely varying RF sources, that RF source may be less reliable for authentication purposes and a user and/or device profile may be configured accordingly.

An acceptable range of signal strengths and/or error rates that are considered a "match" may be set per communication device for a particular user. In this regard, a single user may utilize a plurality of communication devices, such as a Smartphone, laptop, and a Netbook, and each of those devices may have different receive capabilities and may indicate different signal strengths and/or error rates for the same signal. Notwithstanding, if a particular one of the user's devices has widely varying RF reception, that device may be less reliable for authentication purposes and a user and/or device profile may be configured accordingly. For example, fewer transactions, and/or only transactions requiring less security, may be approved of being performed from that device. Similarly, some devices may be more likely to be lost, stolen, and/or out of the user's control and a user and/or device profile may be configured accordingly. For example, fewer transactions, and/or only transactions requiring less security, may be approved of being performed from that device.

An acceptable range of signal strengths and/or error rates that are considered a "match" may be set per transaction. For example, acceptable ranges may be narrower for financial transactions whereas acceptable ranges may be wider for checking email or accessing files stored on a network.

Figure 1B:
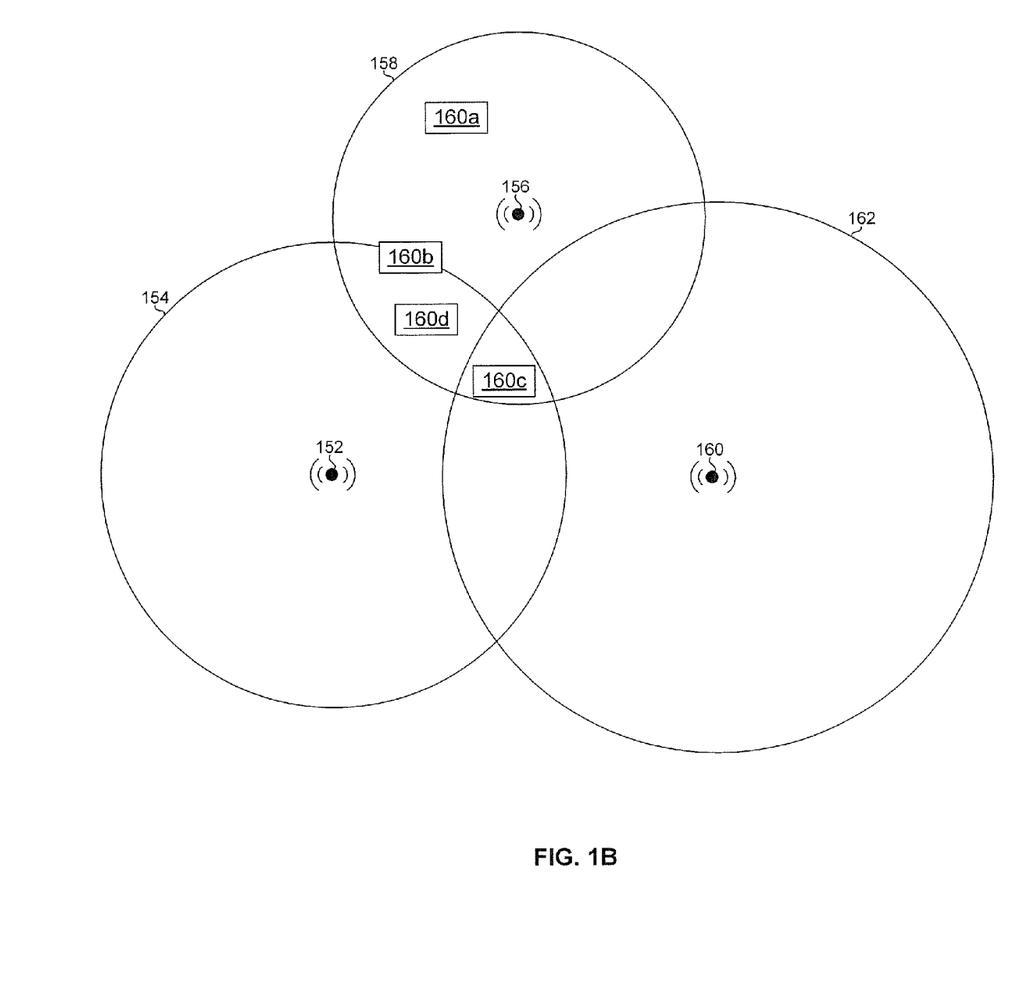
FIG. 1B is a diagram illustrating determination of location based on RF characterization, in accordance with an embodiment of the invention.

FIG. 1B is a diagram illustrating determination of location based on RF characterization, in accordance with an embodiment of the invention. Referring to FIG. 1B, there is shown RF sources 152, 156, and 160; corresponding coverage areas 154, 158, and 162; and locations 160a, 160b, 160c, and 160d.

At location 160a, the signal strength and/or error rate from RF source 156 may be sufficient for the communication device 104 to detect and identify the RF source 156. Accordingly, because there is only a single RF source detected at the location 160a, the possible locations of the communication device 104 are only confined to the coverage area 158. In some instances, such as for transactions requiring only a low level of security, this may be sufficient to authenticate the device 104, its user, and/or its location. However, in other instances, this may be insufficient, at least by itself, to authenticate the device 104 and/or its user. Whether or not the single RF source is sufficient may also depend on the type of the source. For example, a WAP may have a much smaller coverage area than a cellular BS, and thus the WAP may, at least in some sense, provide increased confidence as to location.

For the communication device 104, the location 160b is within the coverage area 158 and is on the edge of the coverage area 154 of the RF source 152. Accordingly, at location 160b, sometimes the communication device 104 may detect and identify the RF source 152 and sometimes it may not. In instances that RF sources 152 and 156 are detected and identified, then the possible locations of the communication device 104 may be confined to the intersection between the coverage area 158 and the coverage area 154. In such instances, the confinement of the communication device 104 to such an area may be sufficient, for example, for transactions requiring a medium level of security level.

Since the location 160b is on the edge of the coverage area of 154, whether the RF source 152 is detected and identified by the communication device 104 at location 160b may depend on, for example, the receive capabilities of the communication device 104 and/or various environmental factors. Consequently, the communication device 104 may repeatedly detect and then lose the signal from the RF source 152. Such intermittent detection of the RF source 152 may be utilized to provide further confidence that the device 104 is at the location 160b. That is, the intermittency of communications from the RF source 152 may indicate that the device 104 is on the edge of the coverage area and thus may distinguish the location 160b from a location such as 160d that is firmly within the coverage area.

At location 160c, the communication device may consistently detect and identify RF sources 152, 156, and 160. Accordingly, the possible locations of the communication device 104 may be confined to the intersection of all three coverage areas. In some instances, this may be a relatively small area and may be sufficient to authenticate the device and/or its user for transactions requiring a high level of security. However, in other instances, this may be insufficient, at least by itself, to authenticate the device 104 and/or its user. In this regard, whether or not the single RF source is sufficient may also depend on the type of the source. For example, a WAP may have a much smaller coverage area than a cellular BS, and thus the WAP may, at least in some sense, provide increased confidence as to location. Furthermore, even if the location is narrowly defined, it may not be a location from which a particular transaction may be performed.

In various embodiments of the invention, an RF source may be mobile, that is moving and/or moveable, but still may be useful in determining a location of the communication device 104. For example, the communication device 104 may detect and identify a BT signal source as being an automobile associated with the communication device 104 and/or a user thereof.

Figure 2:
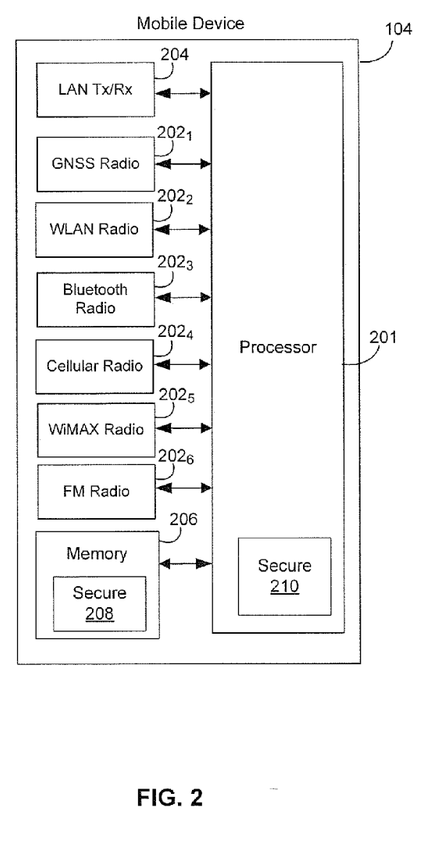
FIG. 2 is a block diagram illustrating an exemplary multi-radio device that is operable to provide RF environment information for authenticating a communication device, its user, and/or its location, in accordance with an embodiment of the invention.

FIG. 2 is a block diagram illustrating an exemplary multi-radio communication device that is operable to provide RF environment information for authenticating a communication device, its user, and/or its location, in accordance with an embodiment of the invention. Referring to FIG. 2, there is shown a mobile device 104. The communication device 104 may comprise a processor 201, a GNSS radio $202_1$, a WLAN radio $202_2$, a Bluetooth radio $202_3$, a cellular radio $202_4$, a WiMAX radio $202_5$, a FM radio $202_6$, a position sample database 214, a memory 206, and a LAN transmitter and/or receiver (Tx/Rx) 222.

The processor 201 may comprise suitable logic, circuitry, interfaces and/or code that may be operable to manage and/or control operations of the communication device 104. In this regard, the processor 201 may control operation of and/or transfers of information between various components of the communication device 104. The processor 201 may be operable to perform and/or assist in the detection and/or identification of RF sources by the various radios $202_1$-$202_6$ of the communication device 104. For example, the processor may characterize signals received from one or more of the radios $202_1$-$202_6$, generate corresponding messages to communicate the RF characterizations to a location server, and convey the messages to a location server via one or more of the LAN Tx/Rx 204 and/or the radios $202_1$-$202_6$. The processor 201 may comprise a security module 210 that may enable authenticating, encrypting, and/or otherwise securing the RF characterization information and the communication thereof. Various security functions may be implemented in hardware to prevent security from being circumvented via software and/or firmware modifications. Utilizing the securing module 210, the processor 201 may be operable to control which transactions are approved to be performed from the device 104 based on authentication of the device's user and/or location via RF characterization.

The GNSS radio $202_1$ may comprise suitable logic circuitry, interfaces and/or code that may be operable to detect and track GNSS radio frequency signals that are received from visible GNSS satellites such as the GNSS satellite system 106. The WLAN radio $202_2$ may comprise suitable logic circuitry, interfaces and/or code that may be operable to transmit and receive WLAN radio frequency (RF) signals compatible with various WLAN standards such as, for example, IEEE Std 802.11, 802.11a, 802.11b, 802.11d, 802.11e, 802.11n, 802.11v, and/or 802.11u. The Bluetooth radio $202_3$ may comprise suitable logic circuitry, interfaces and/or code that may be operable to transmit and receive Bluetooth radio frequency signals. The cellular radio. $202_4$ may comprise suitable logic, devices, interfaces and/or code that may be operable to transmit and receive wireless cellular radio frequency signals such as 2G/2.5G/3G/4G RF signals. The WiMAX radio $202_5$ may comprise suitable logic, devices, interfaces and/or code that may be operable to transmit and receive wireless WiMAX radio frequency signals. The FM radio $202_6$ may comprise suitable logic circuitry, interfaces and/or code that may be operable to receive FM radio frequency signals such as an FM multiplex which may comprise mono and/or stereo audio information and/or RDS data.

The memory 206 may comprise suitable logic, circuitry, and/or code that may be operable to store information such as executable instructions and data that may be utilized for authenticating the communication device 104, its user, and/or its location. The memory 206 may comprise RAM, ROM, low latency nonvolatile memory such as flash memory and/or other suitable electronic data storage. At least a portion 208 of the memory 206 may be secured and the security may be implanted and/or enforced in hardware. At least a portion of the memory may be one-time-programmable and may comprise information that may be utilized in authenticating the device 104, its user, and/or its location.

In operation, the processor 201 may enable one or more of the radios $202_1$-$202_6$ and, for radios that receive a detectable signal, the processor 201 may identify the source of the signal. The order in which one or more of the radios $202_1$-$202_6$ may be unimportant. Alternatively, the order in which one or more of the radios $202_1$-$202_6$ are enabled may be determined based on which radios are most likely to receive a signal. In this manner, an RF characterization of a location may be obtained quicker and/or in a more energy efficient manner. Also, the order in which one or more of the radios $202_1$-$202_6$ are enabled may be determined based on which radios provide the most accurate location information. Most accurate location information may be determined by, for example, the coverage area of the radios, the sensitivity and/or quality of a radio, and/or noise and/or other conditions typical and/or prevalent for various wireless technologies.

When enabled, each of the radios $202_1$-$202_6$ may, for example, perform a scan of one or more frequencies and/or channels supported by the radio in an attempt to detect any signals that may be present. For detected signals, the radios $202_1$-$202_6$ may perform receive operations to recover the signal and may convey the received signal to the processor 201. The processor 201 may then process the received signal in an attempt to identify the source of the signal. In instances that a radio does not detect any signals, the radio may convey just noise to the processor 201 or may provide an indication that no signals were detected.

Upon detecting and identifying a sufficient number of RF sources, the processor 201 may generate an RF characterization of its current location and may send the RF characterization to a location server via the LAN Tx/Rx 204 and/or one or more of the radios 202.sub.1-202.sub.6. In this regard, the RF characterization may be sent to the location server via one or more of the detected and identified RF sources. In this manner, the confidence that the device is in a particular location may be increased by the RF characterization being received via the RF sources that the communication device 104 has purportedly detected and identified from its current location.

Figure 3:
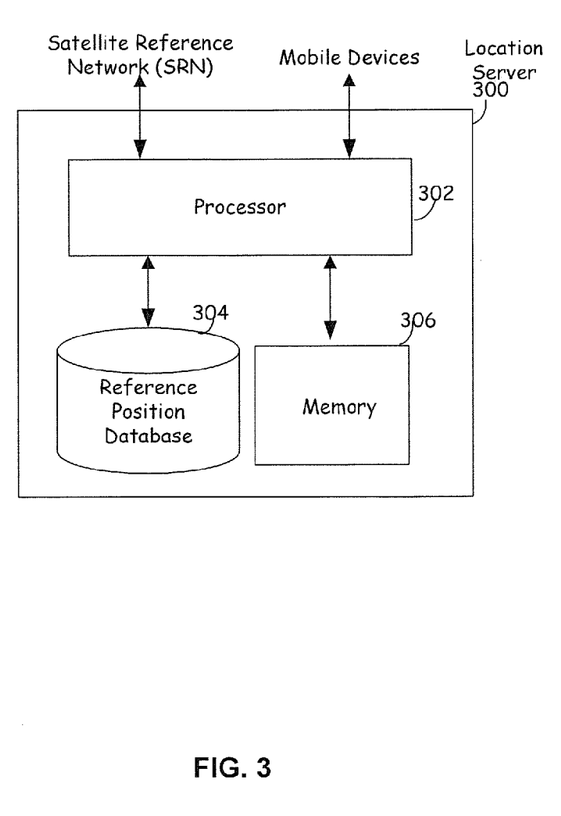
FIG. 3 is a block diagram illustrating an exemplary location server, in accordance with an embodiment of the invention.

FIG. 3 is a block diagram illustrating an exemplary location server, in accordance with an embodiment of the invention. Referring to FIG. 3, there is shown a location server 300. The location server 300 may comprise a processor 302, a RF characterization database 304 and a memory 306.

The processor 302 may comprise suitable logic, circuitry, interfaces and/or code that may be operable to communicate with devices such as the communication device 104 and the web server 122 to authenticate communication devices, their users, and/or their locations. In this regard, the processor 302 may be operable to access and manage the contents of the RF characterization database 304 and the memory 306.

The RF characterization database 304 may comprise suitable logic, circuitry, and/or code that may be operable to store RF characterizations and/or other location information for associated communication devices. The stored location information may be utilized to authenticate communication devices, their users, and/or their locations. The information stored in the database may, for example, be entered and maintained based on RF characterizations received from general communication devices, entered and maintained based on RF characterizations received from particular communication devices (e.g., ones used by workers in the field), and/or manually and/or automatically entered and/or maintained by owners and/or operators of the location server 300.

The memory 306 may comprise suitable logic, circuitry, and/or code that may be operable to store information such as executable instructions and data that may be utilized by the processor 302 and/or other associated component units such as, for example, the reference position database 304. The memory 306 may comprise RAM, ROM, low latency nonvolatile memory such as flash memory and/or other suitable electronic data storage.

In operation, the processor 302 may be operable to receive RF characterizations from communication devices, authenticate the characterizations, and update the contents of the database 304 based on the characterizations. Additionally, the processor 302 may be operable to receive requests for authentication of a device, its user, and/or its location. In response to such requests, the processor 302 may be operable to request and receive RF characterization(s) from the device, compare the received characterization(s) to approved characterization(s), and report the results of the comparison to the requesting device.

Figure 4:
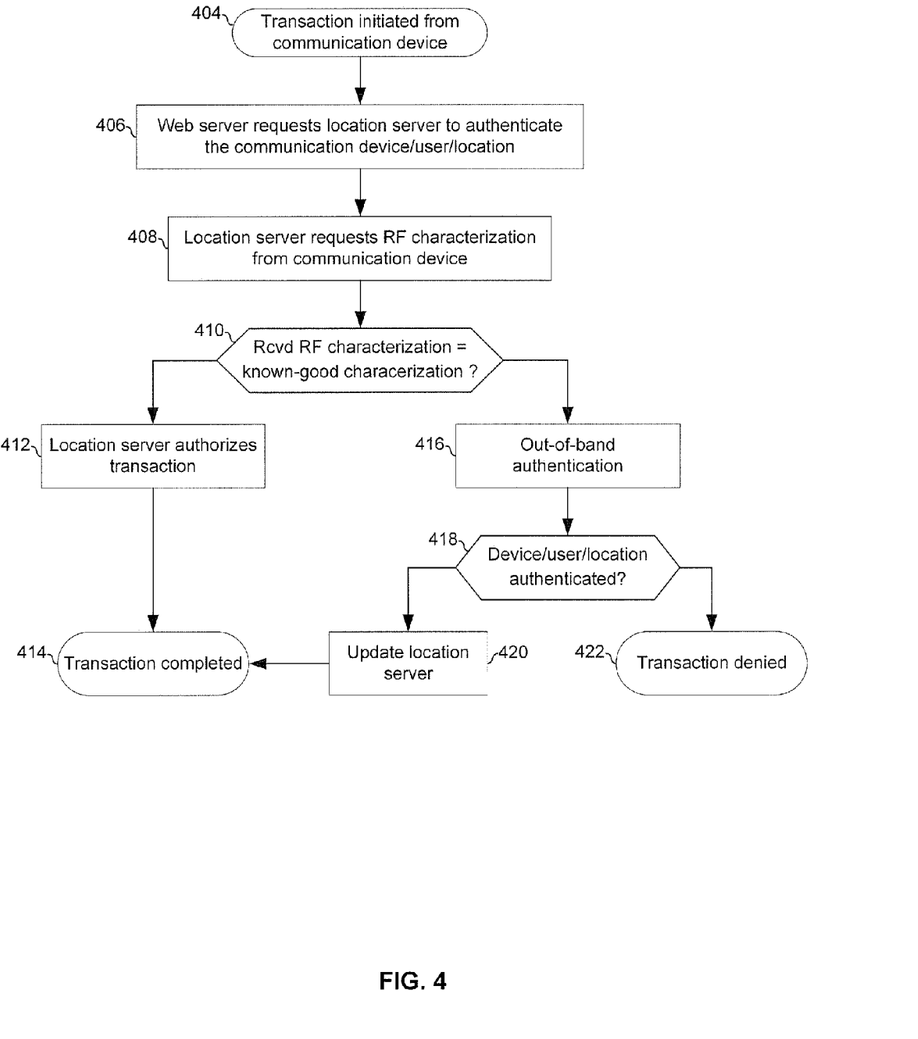
FIG. 4 is a flow chart illustrating exemplary steps for controlling network transactions based on radio frequency (RF) characterization of a location, in accordance with an embodiment of the invention.

FIG. 4 is a flow chart illustrating exemplary steps for controlling network transactions based on radio frequency (RF) characterization of a location, in accordance with an embodiment of the invention. Referring to FIG. 4, the exemplary steps may begin with step 404 when a network transaction, such as an online purchase, may be initiated from the communication device 104. The attempted purchase may be submitted to, for example, the web server 122. The communication device 104 may, for example, be in communication with the web server 122 over the ISP 112 and connection 114b via the LAN Tx/Rx 204. Subsequent to step 404, the exemplary steps may advance to step 406.

In step 406, the web server 122 may send a request to the location server 120 for the location server 120 to authenticate the communication device 102, its user, and/or its location. Subsequent to step 406, the exemplary steps may advance to step 408.

In step 408, the location server 120 may request that the communication device 104 generate a RF characterization of its location and communicate that location to the location server 120. In response the communication device 102 may attempt to detect and identify various RF sources, generate one or more messages to convey the RF characterization, and transmit the RF characterization to the location server 120. The RF characterization may be communicated to the location server 120 via the connection over which the transaction was initiated—the connection comprising the ISP 112 via the LAN Tx/Rx 204 in this instance. Additionally or alternatively, the RF characterization may be communicated to the location server 120 via one or more of the detected and identified RF sources. Subsequent to step 408, the exemplary steps may advance to step 410.

In step 410, it may be determined whether the RF characterization from the communication device matches a approved characterization stored in the location server 120. In instances that there is a match, the exemplary steps may advance to step 412. In step 412, the location server 120 may send authorization to the web server 122 and, in step 414, the transaction may be completed.

Returning to step 410, in instances that there is no match, the exemplary steps may advance to step 416. In step 416, the location server 120 may attempt to authenticate the communication device 104, its user, and/or its location via an out-of-band channel. For example, if the transaction was initiated via the ISP 112, an out-of-band channel may comprise a cellular connection. Accordingly, in step 418, a call may be placed to a phone number associated with the device and/or its user to verify whether the transaction may be fraudulent and/or unauthorized. In instances that the call is fraudulent and/or unauthorized, the exemplary steps may advance to step 422 and the transaction may be denied. In instances that the transaction is approved based on the out-of-band communication, the exemplary steps may advance to step 420.

In step 420, information stored in the location server 120 may be updated based on the out-of-band communication. For example, during the out-of-band communication, the use may indicate that he desires to update his profile to approve transactions of the type at issue from the current location. Subsequent to step 420, the exemplary steps may advance to step 414 and the transaction may be completed.

Various aspects of a method and system for authorizing network transactions based on radio frequency (RF) characterization of a device's location are provided. In an exemplary embodiment of the invention, a network device 120 may determine whether to approve the communication device 104 to perform a network transaction based on results of a comparison between a radio frequency (RF) characterization of a location 102 of the communication device 104 and one or more approved RF characterizations. The RF characterization may be based on information from a plurality of receivers $202_1$-$202_6$ within the communication device 104. The one or more approved characterizations may be stored in the network device 120 and/or in another server or device communicatively coupled to the network device 120. The RF characterization may indicate a quantity of RF sources, such as RF sources 106, 108, 110, 115, 116, and 118, detected and identified by the communication device 104 at the location 102. The RF characterization may indicate signal strength of signals received from RF sources detected and identified by the communication device 104 at the location 102. The transaction may be approved only if signal strength of each of the signals is within a determined window, wherein the size of the window may depend on the type of transaction. The network transaction may comprise, for example, authorizing payment via a credit card or other financial account. The RF characterization may indicate an error rate of signals received from RF sources detected and identified by the communication device 104 at the location 102. Whether to approve the communication device 104 to perform the network transaction may be determined based on preferences established for one or both of the communication device 104 and a user of the communication device 104. Each of the one or more approved characterizations may comprise an RF characterization of a location from which the transaction is authorized.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for authorizing network transactions based on radio frequency (RF) characterization of a device's location.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
receiving, at a network device, a radio frequency (RF) characterization of one or more signals detected by a communication device;
comparing, at said network device, said RF characterization of said one or more signals with one or more previously approved RF characterizations of said one or more signals to determine a match result; and
determining, at said network device, whether to approve said communication device to perform a network transaction based on said match result.

2. The method according to claim 1, further comprising:
receiving a first request at said network device to approve said communication device from a web server that is processing said network transaction between said web server and said communication device;
transmitting a second request from said network device to said communication device for said RF characterization of said one or more signals; and
transmitting said determination whether to approve said communication device to perform said network transaction to said web server;
wherein said receiving of said RF characterization of said one or more signals further comprises receiving signal information from a plurality of receivers within said communication device, said RF characterization being based on said signal information.

3. The method according to claim 1, wherein said comparing further comprises retrieving said one or more previously approved RF characterizations of said one or more signals from said network device or a remote server communicatively coupled to said network device.

4. The method according to claim 1, wherein said receiving of said RF characterization of said one or more signals further comprises receiving a quantity of RF sources detected and identified by said communication device, said RF characterization indicating said quantity.

5. The method according to claim 1, wherein said receiving of said RF characterization of said one or more signals further comprises receiving signal strengths of signals received from RF sources detected and identified by said communication device, said RF characterization indicating said signal strengths.

6. The method according to claim 5, wherein said determining further comprises approving said network transaction when each of said signal strengths of said signals is within a range of signal strengths, wherein said range is previously set by a user of said communication device based on at least one of:
a level of variability of said RF sources at various locations of said communication device;
a reliability of said RF sources; and
a type of said network transaction.

7. The method according to claim 1, wherein said receiving of said RF characterization of said one or more signals further comprises receiving an error rate of signals received from RF sources detected and identified by said communication device, said RF characterization indicating said error rate.

8. The method according to claim 1, wherein said determining further comprises determining whether to approve said communication device to perform said network transaction based or preferences established for said communication device or a user of said communication device.

9. A network device, comprising:
   a characterization database configured to store one or more approved radio frequency (RF) characterizations of one or more signals for detected by a communication device; and
   a processor configured to:
      receive an RF characterization of said one or more signals detected by said communication device;
      compare said RF characterization of said one or more signals with said one or more approved RE characterizations of said one or more signals to determine a match result; and
      determine whether to approve said communication device to perform a network transaction based on said match result.

10. The network device according to claim 9, wherein said RF characterization of said one or more signals is based on information from a plurality of receivers within said communication device.

11. The network device according to claim 9, wherein said one or more approved RF characterizations of said one or more signals are additionally stored in a remote server communicatively coupled to said network device.

12. The network device according to claim 9, wherein said RF characterization of said one or more signals indicates a number of RF sources detected and identified by said communication device.

13. The network device according to claim 9, wherein said RF characterization of said one or more signals indicates signal strengths of signals received from RF sources detected and identified by said communication device.

14. The network device according to claim 13, wherein said processor is further configured to approve said network transaction when each of said signal strengths of said signals is within a range of signal strengths, wherein said range is previously set by a user of said communication device based on at least one of:
   a level of variability of said RF sources at various locations of said communication device;
   a reliability of said RF sources; and
   a type of said network transaction.

15. The network device according to claim 9, wherein said RF characterization of said one or more signals indicates an error rate of signals received from RF sources detected and identified by said communication device.

16. The network device according to claim 9, wherein said processor is configured to determine whether to approve said communication device to perform said network transaction based on preferences established for said communication device or a user of said communication device.

17. A method, comprising:
   generating, at a communication device, a characterization of one or more signals detected by said communication device;
   transmitting said characterization of said one or more signals from said communication device to a network device that has received a request to approve said communication device to perform a network transaction; and
   receiving, at said communication device, a determination from said network device whether to approve said communication device, said determination being based on a comparison between said characterization of said one or more signals and one or more previously approved characterizations of said one or more signals at said network device.

18. The method of claim 17, wherein said generating further comprises:
   detecting and identifying one or more sources of said one or more signals; and
   wherein said transmitting further comprises:
   transmitting said characterization of said one or more signals via at least one of said one or more detected and identified sources.

19. The method of claim 18, wherein said detecting and identifying comprises:
   detecting and identifying said one or more sources with corresponding transceivers in a specified order based on at least one of:
   a level of accuracy of each of said transceivers, beginning with a transceiver with a higher level of accuracy from among said transceivers;
   a likelihood of each of said transceivers to detect one of said one or more signals, beginning with a transceiver with a higher likelihood from among said transceivers;
   an energy efficiency of each of said transceivers, beginning with a transceiver with a higher energy efficiency from among said transceivers; and
   a speed of acquiring one of said one or more signals beginning with a transceiver with a higher speed of acquiring from among said transceivers.

20. The method of claim 17, wherein said generating further comprises generating one or more signal strengths for said one or more signals.

* * * * *

UNITED STATES PATENT AND TRADEMARK OFFICE
CERTIFICATE OF CORRECTION

PATENT NO. : 9,449,345 B2  
APPLICATION NO. : 12/748197  
DATED : September 20, 2016  
INVENTOR(S) : Lundgren et al.

Page 1 of 1

It is certified that error appears in the above-identified patent and that said Letters Patent is hereby corrected as shown below:

On the Title Page

In item (57) (ABSTRACT), replace "between a radio frequency (RE) characterization of" with --between a radio frequency (RF) characterization of--.

In the Claims

In Column 13, Line 10, replace "based or preferences" with --based on preferences--.

In Column 13, Line 15, replace "more signals for detected by" with --more signals detected by--.

In Column 13, Lines 21-22, replace "approved RE characterizations" with --approved RF characterizations--.

In Column 14, Lines 48-49, replace "one or more signals beginning" with --one or more signals, beginning--.

Signed and Sealed this  
Thirteenth Day of March, 2018

Andrei Iancu  
*Director of the United States Patent and Trademark Office*